United States Patent [19]

Fossum et al.

[11] Patent Number: 4,583,222
[45] Date of Patent: Apr. 15, 1986

[54] METHOD AND APPARATUS FOR SELF-TESTING OF FLOATING POINT ACCELERATOR PROCESSORS

[75] Inventors: Tryggve Fossum, Northboro; Milton L. Shively, Stow, both of Mass.

[73] Assignee: Digital Equipment Corporation, Maynard, Mass.

[21] Appl. No.: 549,612

[22] Filed: Nov. 7, 1983

[51] Int. Cl.⁴ ............................................. G06F 11/22
[52] U.S. Cl. ....................................... 371/16; 364/200
[58] Field of Search ............... 371/9, 11, 16; 364/200, 364/748, 186, 187

[56] References Cited

U.S. PATENT DOCUMENTS

| | | | |
|---|---|---|---|
| 3,916,178 | 10/1975 | Greenwald | 371/16 |
| 4,228,496 | 10/1980 | Katman et al. | 364/200 |
| 4,387,427 | 6/1983 | Cox et al. | 364/200 |
| 4,443,849 | 4/1984 | Ohwada | 364/200 |
| 4,462,075 | 7/1984 | Mori et al. | 364/200 |

*Primary Examiner*—Charles E. Atkinson
*Attorney, Agent, or Firm*—Cesari and McKenna

[57] ABSTRACT

A mechanism for continually testing a first processor element in a suitable multiprocessor system in which at least first and second processor elements are connected to a common input bus to concurrently receive the same opcodes and operands. Both processors decode the opcodes; when an opcode indicates an operation to be performed by the second processor, the first processor responds by executing a diagnostic operation during the second processor's execution cycle, instead of remaining idle for that time. The particular diagnostic operation to be performed is selected from among a multiplicity of available diagnostic operations. The selection is dependent on the instruction to be executed by the second processor; that is, in order to not slow down the overall execution rate of the system, a diagnostic operation is chosen whose execution time is somewhat shorter than the execution time of the instruction being performed by the second processor. Operand data supplied for the second processor's operation may be used as test data by at least some of the diagnostic operations for the first processor, to facilitate detection of bits forced to a zero or one value. Both data paths and control logic of the first processor are checked during the execution of each instruction intended for another processor, without slowing overall system response or adding more than an insignificant marginal cost. The diagnostic system is self-executing and is completely transparent to the programmer.

11 Claims, 5 Drawing Figures

METHOD AND APPARATUS FOR SELF-TESTING OF FLOATING POINT ACCELERATOR PROCESSORS

BACKGROUND OF THE INVENTION

1. Field of the Invention

This invention relates generally to digital data processing systems and specifically to the on-line testing of processor elements within data processing systems. More particularly, it relates to the diagnostic testing of a processor element in a floating point accelerator portion of a data processing system. This testing is carried out without impairing the response or execution time of the system and adds virtually no cost to the system; it uses system resources that otherwise would be idle while the tests are running. In addition, live data is used to provide test sequence operands, to enhance detection of data-dependent errors.

2. Description of the Prior Art

A digital data processing system generally includes three basic elements; namely, a memory element, an input/output element, and a processor element, all interconnected by one or more busses. The memory element stores data in addressable storage locations. This data includes both operands and operations for processing the operands. The processor element causes data to be transferred to or fetched from the memory element, interprets the incoming data as either operations or operands, and processes the operands in accordance with the operation. The results are then stored in addressed locations in the memory element. An input/output element also communicates with the memory element and the processor element in order to transfer data into the system and to obtain the processed data from it. The input/output element normally operates in accordance with control information supplied to it by the processor element. The input/output element may include, for example, printers, teletypewriters or keyboards and video display terminals, and may also include secondary data storage devices such as disk drives or tape drives.

Data processing (i.e., computer) systems frequently utilize multiple processor elements to execute or supervise the various operations and tasks they are designed to perform. For example, separate processor elements are sometimes provided to carry out input/output operations, to control peripheral devices and to perform other separable tasks. Further, actual data processing functions also may be divided among multiple processors, as well. Sometimes a special type of processor element, termed a floating point accelerator, is provided for performing floating point arithmetic calculations. Floating point accelerators are specially designed to increase the speed with which floating point calculations may be performed; when a floating point operation is to be performed, it is executed in or by the floating point accelerator rather than in another processor.

Users and designers of data processing systems demand highly reliable and accurate operation. For this reason, error detecting and correcting mechanisms are provided throughout modern data processing systems. However, such mechanisms generally cannot detect or correct data which is erroneous but not logically corrupted. One place where data having these characteristics can originate is in the execution of arithmetic operations and, in particular, floating point operations. For this reason, it has long been a practice in the data processing industry for computer programmers to build into programs using floating point operations some steps for checking the results of such operations to be sure that those results fall within the range of numerical values in which correct results would occur. Thus, in a payroll calculation program for factory workers whose take home pay might be expected to fall within the predetermined range of $300-$500 per week, the program might be provided with instructions to check the calculation to be certain that no payroll check is written for more than some preset limit, such as the aforesaid $500. Of course, the input data used by the payroll program also could be checked similarly to verify that all parameters have values within expected ranges (insuring, for example, that no worker is paid for putting in an impossible two hundred hour work week). Once a floating point error is detected as having occurred, diagnostic measures must then be employed to analyze the error and locate its cause. If the cause is an intermittent or "soft" failure, this may be difficult to do.

Another approach to verification of floating point operations, usable with time-sharing systems, is to assign to one system "user" the task of doing nothing but running a sequence of floating point diagnostic operations all the time. To be effective, however, this technique generally requires that such operations be performed with known data so that the actual results may be compared against expected results. Some errors may be data-dependent, though, in which event the selected tests may not detect such errors unless the operand data is varied from time to time. Further, many erroneous floating point operations may be executed between the time a failure takes place in a floating point accelerator and the time the next diagnostic operation is run which is capable of detecting the failure. Indeed, so as not to increase significantly the overhead of operating the system and so as not to slow down the response time for other users, it is necessary and intended that the diagnostic operations occupy the system's processor elements only a small fraction of the time. But this ensures that floating point processor failures may cause erroneous results before being detected by the diagnostics.

SUMMARY OF THE INVENTION

These and other limitations of the prior art are addressed by the present invention, which provides a mechanism for continually testing a floating point accelerator processor element or other processor element in a suitable multiprocessor system. This invention does not slow down the response time of the system, adds an insignificant marginal cost and is completely transparent to the programmer.

According to the invention, at least two processors, such as an instruction execution processor (EU) and a floating point accelerator processor (FPAP), are connected to a common input bus in parallel, to concurrently receive the same information which is placed on the bus by another device (e.g., an instruction and operandfetching element). The information on the bus is packaged in a predefined format, as bytes containing instruction operation codes (i.e., "opcodes") for operations to be performed and operand data, the variable information to be used in executing those operations. Both the instruction execution processor and the floating point accelerator processor decode the opcodes. When the EU decodes an opcode which signifies an operation to be executed by the EU, it executes that operation. When the FPAP decodes an opcode as specifying an operation to be performed by the FPAP, it executes the operation. Normally the FPAP has no instruction execution responsibilities during an EU instruction cycle. Therefore, in accordance with the present invention, when the FPAP decodes an opcode for an operation to be executed by the EU, the FPAP, instead of remaining idle while the EU operates, executes a diagnostic operation.

The FPAP selects the particular diagnostic operation to perform in each instance from among a multiplicity of available diagnostic operations. The selection of a diagnostic operation is dependent on the operation to be executed by the EU. In order to not slow down the overall execution rate of the system, a diagnostic operation is chosen whose execution time is matched to the execution time of the operation being performed by the EU; that is, a diagnostic operation is selected such that the FPAP will finish the operation before the EU will finish executing its operation. The system designer must have a priori knowledge of EU operation execution times and FPAP diagnostic operation execution times and must map the EU operations to FPAP diagnostic operations so as to accomplish this result. Accordingly, the actual correspondence between EU operations (or instruction opcodes) and FPAP diagnostic operations is a matter of design choice and is not a limiting feature of the invention.

Since the FPAP receives operand data as well as opcodes over the instruction (operation) bus, operand data is used by many of the diagnostic operations, to add a degree of randomness to the test signals. This makes it possible to detect errors which are dependent on bit values, such as errors caused by bits forced to a steady value of zero or one. It should be noted that the operand data thus used may constitute operands normally destined for the EU; though these operands are not intended to be floating point numbers, they may be interpreted by the FPAP as though they were, in fact, floating point numbers, and may be used in the diagnostic operations the same as floating point numbers. One or more additional variables may be obtained from the EU via a write bus or from general purpose registers.

In this manner, both the data paths and the control logic of the FPAP are checked during the execution of every non-floating point operation, thus permitting rapid detection of FPAP faults and, in turn, permitting the system to disable a defective FPAP (in many cases) before it has been given a chance to generate unreliable output information.

When an FPAP self-diagnostic routine is performed as herein described, and an error condition occurs or is detected thereby, an FPAP error signal is generated. That FPAP error signal is latched in the FPAP until the EU is available to process it, which will be during the time the FPAP is processing the next floating point operation. Other supporting data may also be stored, such as an identification of the diagnostic sequence being run when the error occurred, the operand data being used by the diagnostic operation, and the erroneous results generated by the floating point processor. While the next floating point operation is being executed, the error is reported to the EU, which determines the cause of the error condition insofar as it is able to do so, at least identifying the module involved. If the cause of the error is such that the "next" floating point operation will not be executed properly, that operation can be aborted; or if the cause of the error is isolated from and will not affect the integrity of that next operation, it can be allowed to proceed.

Moreover, by using pseudorandom operand data and constantly running diagnostic tests in the "background," over a long period of time more diagnostic tests are performed on the FPAP than would be performed were the usual prior art approaches utilized instead.

The present invention also is useful in testing the design of an FPAP, facilitating the distinguishing of transient errors from design errors. That is, when an FPAP diagnostic procedure results in an error being detected, the error can be analyzed to determine whether it reflects a systematically occuring problem. One way to do so is to run the same diagnostic procedure with the same operand data on a second system of like design. If the same error occurs, its cause may be presumed to be a design flaw rather than some transient condition.

BRIEF DESCRIPTION OF THE DRAWING

The invention is pointed out with particularity in the appended claims. The above and further objects and advantages of the invention may be better understood by referring to the following description taken in conjunction with the accompanying drawings in which:

DESCRIPTION OF AN ILLUSTRATIVE EMBODIMENT

Figure 1:
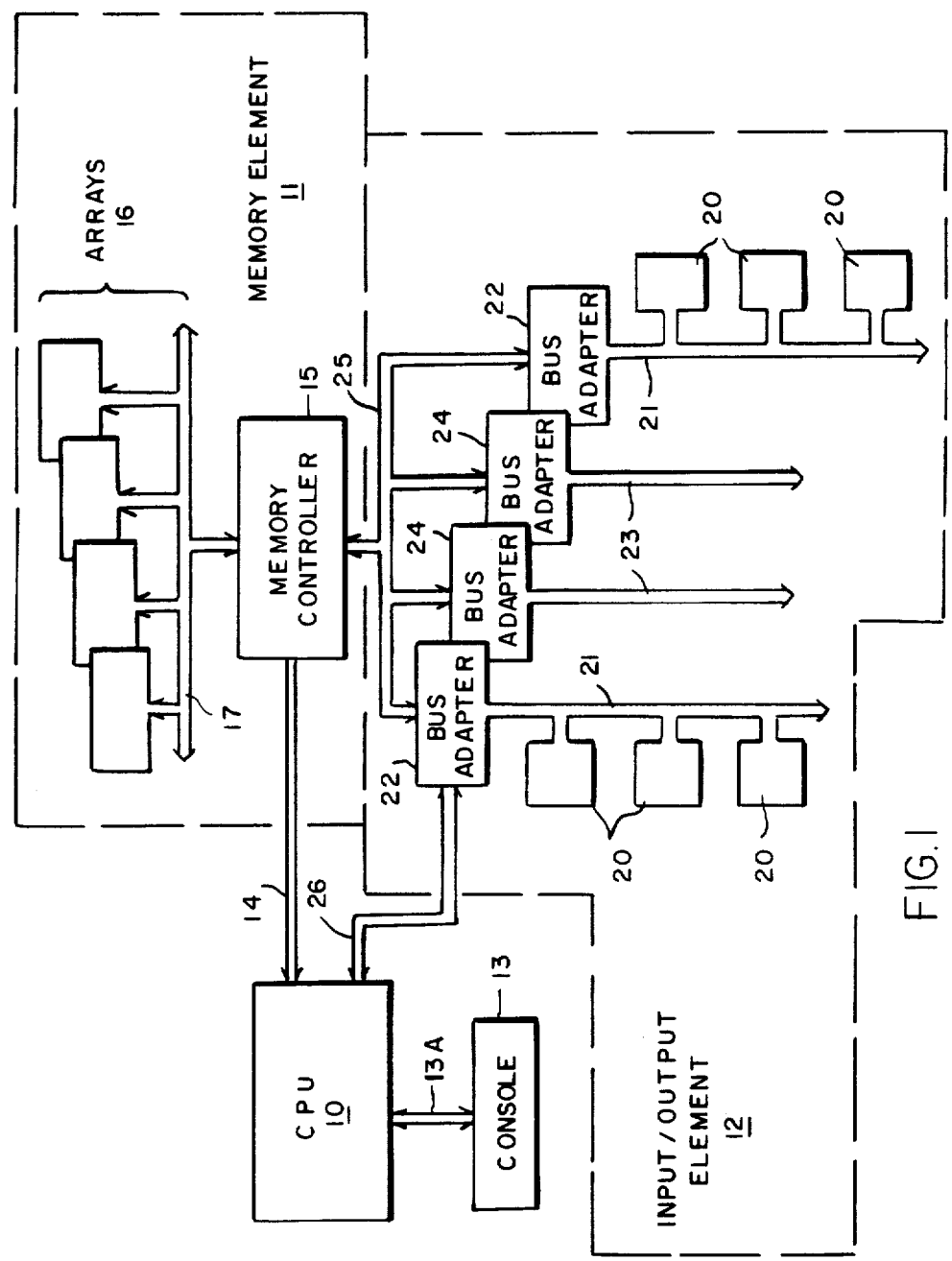
FIG. 1 is a general block diagram of a digital data processing system incorporating multiple processor elements, such as in a central processing unit, and constituting an exemplary environment for the present invention.

As exemplified in FIG. 1, the basic elements of a data processing system including the invention comprise a central processor unit (CPU) 10, a memory unit 11, and an input/output element 12. The CPU 10 executes instructions that are stored in addressable storage locations in the memory unit 11. The instructions identify operations that are to be performed on operands, which are also stored in addressable locations in the memory unit. The instructions and operands are fetched by the CPU 10 as they are needed, and processed data are returned to the memory unit. The CPU 10 also transmits control information to units in the input/output element, enabling them to perform selected operations, such as transmitting data to or retrieving data from the memory unit 11. Such data may be instructions, operands which may be transmitted to the memory unit or processed data which is retrieved from the memory for storage or display.

An operator's console 13 serves as the operator's interface. It allows the operator to examine and deposit data, halt the operation of the central processor unit 10, or step the central processor unit through a sequence of instructions and determine the responses of the processor in response thereto. It also enables an operator to initialize the system through a boot strap procedure, and perform various diagnostic tests on the entire data processing system.

The central processor unit 10 is connected to the memory unit 11 through several buses generally identified by the reference numeral 14. Specifically, the central processor unit 10 is directly connected to a memory controller 15, which, in turn, connects to a plurality of arrays 16 over an array bus 17. In one specific embodiment, the memory controller also houses a cache memory. Memory controller 15 includes circuitry for retrieving the contents of an addressed location from either the cache or the array 16 and for storing information therein in a conventional manner. Cache memories are well-known in the art and will not be discussed further.

The data processing system may include several types of input/output units, including disk and tape secondary storage elements, teletypewriters, keyboards and video display terminals, and the like. These units 20 are connected through an input/output bus 21 to a bus adapter 22. The input/output bus 21 may be as described in U.S. Pat. No. 4,232,366, which was issued in the name of John V. Levy, et al, and assigned to the assignee of the present invention, the patent entitled "Bus For Data Processing System With Overlap Sequences". Other types of input/output buses may also be used to connect to similar input/output units (not shown), including an input/output bus 23, connected to a bus adapter 24, which may be as described in U.S. Pat. No. 3,815,099, issued June 4, 1974, in the name of J. Cohen et al, and entitled "Data Processing System".

The bus adapters 22 and 24 are connected to transmit and receive data from memory controller 15 over an adapter bus 25. The bus adapters are also connected by an interrupt request/grant bus 26, over which the bus adapters can interrupt the processing of central processor unit 10 in the event of a change of status of one or more of the input/output units 20 in a conventional manner. The central processing unit 10 thus transfers interrupt request/grant signals directly with units in the input/output element, and transmits control information to, and receives status information from, the units in the input/output element 12 through memory controller 15. The memory controller thus controls the transfer of data to and from the central processing unit 10 and the input/output element 12, and the transfer of control and status information between the central processing unit and input/output element 12.

Figure 2:
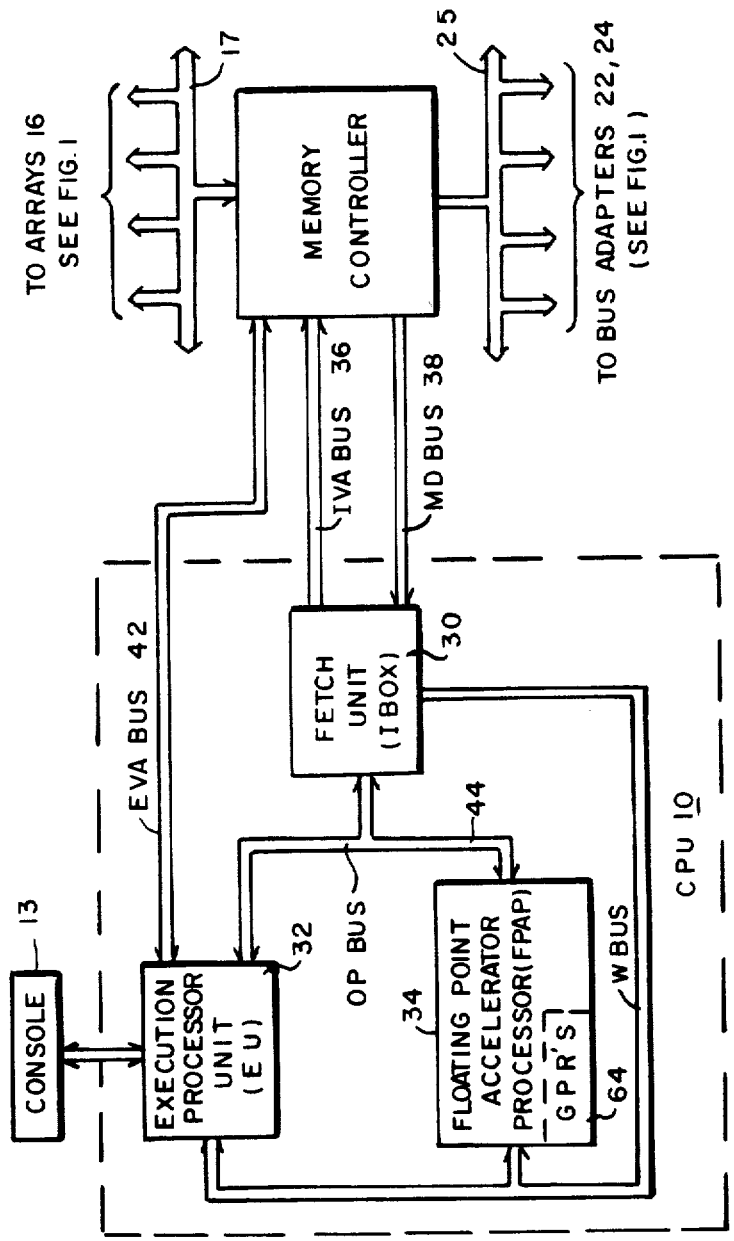
FIG. 2 is a block diagram similar to that of FIG. 1 but showing in greater an exemplary internal organization of the central processor, utilizing therein multiple processors such as an execution unit processor and a floating point accelerator unit processor wherein the present invention is of particular utility.

The present invention relates, in particular, to the central processor unit 10, which is shown in expanded detail in FIG. 2. Functionally, the CPU 10 contains three subunits: an instruction and operand (i.e., data) fetch unit (IBOX) 30, an execution processor unit (EU) 32, and a floating point accelerator processor unit (FPAP) 34. The IBOX 30 supplies to memory controller 15, via instruction virtual address bus 36, the virtual address for each instruction (or sequence of instructions) to be fetched from memory array 16 and for each result to be written to memory array 16. IBOX 30 writes information to memory controller 15 (for transmission to memory array 16) and reads information from memory controller 15 via memory data bus 38.

CPU 10 is connected with memory controller 15 via a third bus 42, the purpose and operation of which are further described below. The busses 36, 38 and 42 correspond to the several busses 14 of FIG. 1.

Figure 3:
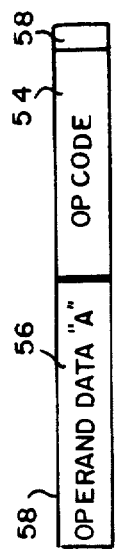
FIG. 3 is a diagrammatic illustration of a byte of information as might be communicated to the floating point accelerator processor 34 of FIG. 2.

The instruction fetch unit 30 retrieves from memory the instructions to be executed in the CPU 10 and the operand data to be used in the execution of those instructions. Such instructions and operand data are then provided to EU 32 and FPAP 34 simultaneously via an operation bus (opbus) 44. Information transmitted on the opbus 44 may, for example, be packaged in bytes of a predetermined number of bits. In one possible arrangement, as illustrated in FIG. 3, a single byte 52 provides both an instruction opcode 54 and data 56 for a first operand "A". Of course, opcode 54 and operand 56 could be provided in separate bytes, as well. Operand 56, of course, often may constitute an operand normally destined for the EU; though such an operand is not intended to represent a floating point number, itmay be interpreted by the FPAP as though it were, in fact, a floating point number, and may be used in the diagnostic operations the same as a floating point number.

Two types of opcodes are provided over opbus 44. Typically the type of opcode will be designated by one or more preassigned bits within the opcode itself. For example, the first bit 58 of the opcode 54 may be used to designate the opcode type. A first type of opcode designation (e.g., bit 58 having a value of 0) indicates an operation to be performed by the execution processor 32, while a second type of opcode (e.g., bit 58 having a value of 1) indicates an operation to be performed by floating point accelerator processor 34. EU 32 and FPAP 34 concurrently decode the opcodes 54 on bus 44 and each such processor, upon recognizing an opcode for an operation directed to that processor undertakes to perform the indicated operation. The results of operations performed by EU 32 and FPAP 43 are returned to IBOX 30 via a WRITE bus (WBUS) 62. Results of register changes are also reported by IBOX 30 and EU 32 via WBUS 62, to the FPAP 43 and IBOX 40, as appropriate.

In accordance with the present invention, however, when the FPAP 34 detects an opcode for an operation to be performed by the EU 32, the FPAP selects a diagnostic operation to perform on itself and then executes that diagnostic operation. The selection of the diagnostic operation is dependent on the specific EU-type opcode which was decoded. That is, each EU-type opcode is matched to one or more diagnostic operations which require less time to execute in the FPAP than the minimum time required for the EU to execute the operation indicated by that opcode. If more than one diagnostic operation is selectable in response to a particular opcode, then reference may be made to one or more bits in an operand to make the final choice of diagnostic routine.

As FPAP operations generally involve the execution of an arithmetic operation upon two operands, a second source of operands is needed in addition to the operands A provided over opbus 44. Two sources of operands are provided in addition to opbus 44. The second source is the WRITE bus 62, which can supply data from the execution processor 32 and instruction fetch unit 30. A third source is a set of general purpose registers (GPR's)

64 provided within the floating point accelerator processor itself.

Figures 4, 5:
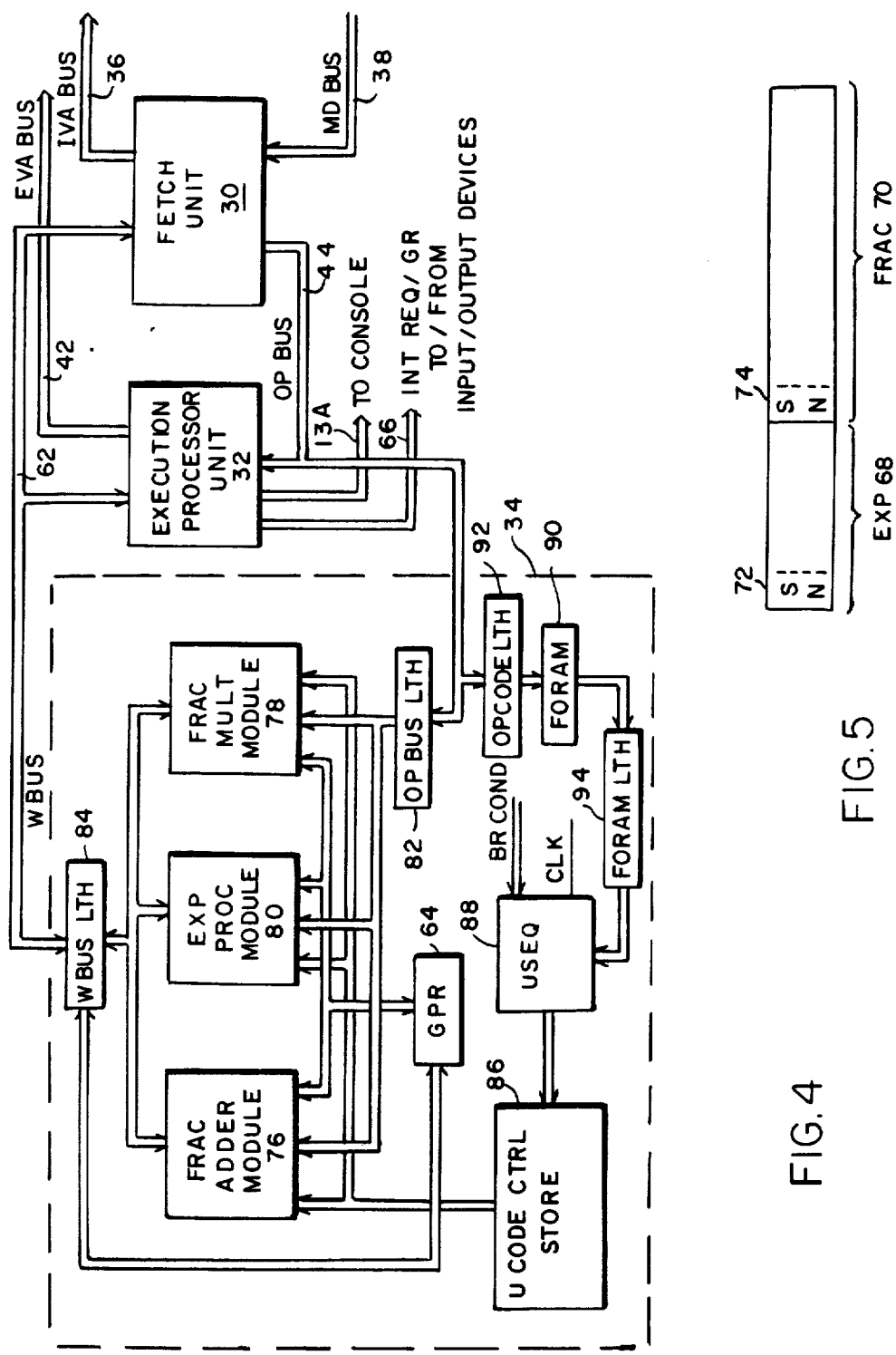
FIG. 4 is a block diagram of a portion of the system of FIG. 2. showing in greater detail the internal organization of the floating point accelerator processor 34 thereof.
FIG. 5 is a diagrammatic illustration of the format of a floating point data word such as may be processed by the floating point accelerator of FIGS. 2 and 4, and which is useful in understanding the invention.

FIG. 4 illustrates a central processor unit 10 which contains the invention. The central processor unit 10 is identical to the central processor unit contained in U.S. patent application Ser. No. 549,611, titled Microcode Control System for Digital Data Processing System filed on even date herewith, and reference may be made to that application, the disclosure of which is hereby incorporated by reference herein, for details of the structure and operation thereof. In brief, the central processing unit 10 includes a fetch unit 30 and an execution processor unit 32 which transmit addresses over busses 36 and 42, respectively, to a memory (not shown). Fetch unit 30 receives instructions from the memory over a memory data bus 38. The fetch unit decodes the instructions, fetches the operands and transmits them to execution processor 32 or to a floating point accelerator processor 34 over an operand bus 44. The execution unit 32 generally executes the instructions, except for a well-known class of instructions for operations termed "floating point" operations, which are executed by floating point accelerator processor 34. The results of the processing are returned to fetch unit 30 over a WRITE bus (WBUS) 62 for storage in the memory over memory data bus 38.

The execution unit 32 is also connected to a console (not shown) over a console bus 13A. The console serves as the operator's interface, and allows the operator to examine and deposit instructions and operands, halt the operation of the central processor unit 10, or step the central processor unit through a sequence of instructions and determine its responses thereto. The console also enables an operator to initialize the system through a bootstrap procedure, and perform various diagnostic tests on the entire data processing system.

Finally, the execution unit 32 is also connected over an interrupt request/grant bus 66 to units in an input/output system (not shown) which may include conventional printers, teletypewriters, and keyboards-video display units, as well as disk and tape drives. Bus 66 carries interrupt request signals from the input/output devices to execution unit 32, and interrupt grant signals from the execution unit to the input/output units.

As has been mentioned, the floating point accelerator processor 34 processes floating point instructions (and, equivalently, operations). These instructions enable the processor to perform operations on operands in floating point format, which are illustrated in FIG. 5. A floating point operand includes an exponent portion 68 and a fraction portion 70, each of which includes a sign bit 72 and 74 which identifies the sign of the respective portion 68 and 70 to indicate a positive or negative value. Floating point instructions are generally limited to arithmetic instructions such as addition, subtraction, multiplication, and division, or variations on these instructions. The floating point accelerator processor 34 is provided with two fraction processing data paths, one, addition module 76, performing addition and subtraction, and the other, multiplication module 78, performing multiplications and divisions, on the fraction portion 70 of the operand. An exponent processing module 80 processes the exponent portion 63 of the floating point operand during any of the floating point operations.

The processing modules 76, 78 and 80 receive floating point operands from a number of sources. One source is the operand bus 44, and specifically from an operand bus latch 82. Another source of operands is the WRITE bus 62, and specifically from a WRITE bus latch 84. The third source of operands for the processing logic 76, 78 and 80 is a set of general purpose registers 64 which are maintained in floating point accelerator processor 34. The general purpose registers 64 are loaded through the WRITE bus latch 84 by execution unit 32.

The processing modules 76, 78 and 80 are under control of microinstructions provided by a microcode control store 86 selected by a microsequencer 88 in a conventional manner.

In addition, the operation of microsequencer 88 is under the control of a floating point diagnostics dispatch (random access memory) (FDRAM) 90, which operates as follows. An opcode latch 92 monitors the opcodes transmitted over opbus 44 and latches the opcodes of instructions appearing thereon. The FDRAM, in response to the value of the opcode in latch 92, supplies a corresponding previously selected address; this address is latched into an FDRAM latch 94 and from there is supplied to the microsequencer 88 as the starting location for a sequence of microinstructions. When the opcode in latch 92 designates an EU operation, the location supplied by FDRAM 90 is the start of an FPAP diagnostic sequence.

A typical FPAP diagnostic sequence conducted in this manner might, for example, involve execution of the calculation AB-BA and testing the result for a zero value, where "A" denotes a first variable and "B" denotes a second variable. The value of one of the variables, such as "A", can, as stated above, be an operand value from opbus latch 82; while the value of the other variable (in this case "B") is obtained from WBUS 62 or from GPR's 64.

When an FPAP self-diagnostic routine is performed as herein described, and an error condition occurs or is detected thereby, an FPAP error signal is generated. That FPAP error signal is latched in the FPAP until the EU is available to process it, which will be during the time the FPAP is processing the next floating point operation. Other supporting data may also be stored, such as an identification of the diagnostic sequence being run when the error occurred, the operand data being used by the diagnostic operation, and the erroneous results generated by the floating point processor. While the next floating point operation is being executed, the error is reported to a system "error log" of the type conventionally maintained by the operating system of a data processing system. Before the results of that next floating point operation are reported, the EU will (using conventional methodologies for analyzing floating point errors) determine the cause of the error condition insofar as it is able to do so, at least identifying the module involved. If the cause of the error is such that the "next" floating point operation will not be executed properly, that operation can be aborted; or if the cause of the error is isolated from and will not affect the integrity of that next operation, it can be allowed to proceed and return its results when concluded. For example, if the error was found to be attributable to the fraction adder module 76 but that module is not used in the execution of the "next" operation, there is no reason to abort that next operation. If the operation must be aborted, it can be tried again or it can be executed in the EU, instead, since the EU can perform floating point operations also, though not as quickly as the FPAP. Sometimes, of course, the cause of an error is transient and a retry of the operation will be successful. Thus, the further action to be taken in response to detection of an error requires analysis to ascertain whether the error is persistent. If not, or if only infrequent, no further action may be necessary. If, however, the error recurs too frequently, intervention by a service technician will be required.

Although the foregoing description has been limited to a specific exemplary embodiment of the invention, it will be apparent that various alterations, modifications and improvements readily will occur to those skilled in the art. It will be apparent, moreover, that the invention can be practiced in systems having diverse basic constructions or that use different internal circuitry than is disclosed in this specification with the attainment of some or all of the advantages of the invention. Such obvious alterations, modifications and improvements, though not expressly described above, are nonetheless intended to be implied and are within the spirit and scope of the invention. Accordingly, the foregoing discussion is intended to be illustrative only, and not limiting. It is the object of the appended claims to cover all such variations and modifications as come within the true spirit and scope of the invention.

What is claimed is:

1. In a data processing system having two processor units arranged such that a first one of such processor units is substantially idle while the second one of the processor units is executing instructions, the improvement comprising:
   a. the first processor unit including means for detecting the beginning of an interval during which the second processor will be executing an instruction and in which the first processor will be idle; and
   b. means for selecting a diagnostic operation to be run in said first processor while the second processor is executing said instruction, the diagnostic operation being selected from among a plurality of available diagnostic operations and being selected such that the first processor will finish executing the diagnostic operation before the second processor finishes executing said instruction.

2. The data processing system of claim 1 further including means for supplying to the first and second processors the same operand data, whereby such operand data may be used by the first processor in performing diagnostic operations.

3. The data processing system of claim 2 wherein the first processor is a floating point accelerator processor.

4. The data processing system of claim 1 further including means for supplying to both processors the same instruction opcodes and wherein the means for detecting the beginning of an interval during which the second processor will be executing an instruction and in which the first processor will be idle includes means for decoding said instruction opcodes and identifying therefrom instructions to be executed by the second processor.

5. The data processing system of claim 4 wherein the means for selecting a diagnostic operation to be run in said first processor while the second processor is executing an instruction is adapted to select such diagnostic operation in response to the opcode of the instruction to be executed by the second processor.

6. The data processing system of any of claims 1-5 wherein the diagnostic operations are adapted to check the operation of the first processor's control logic as well as its data paths.

7. A self-test mechanism for a floating point accelerator processor in a data processing system having both a first, floating point accelerator processor unit for performing floating point operations and a second processor unit for performing at least non-floating point operations, and an operand bus for supplying concurrently to both processors opcodes and operands for operations to be performed by those processors, each opcode signifying either an operation to be performed by the FPAP or an operation to be performed by the second processor, such mechanism comprising:
   a. the floating point accelerator processor including means for decoding the opcodes supplied on the bus; and
   b. means responsive to said decoding means for initiating, in response to the detection of an opcode for a non-floating point operation, a self-diagnostic operation to be run in the FPAP.

8. The self-test mechanism of claim 7 wherein the diagnostic operation initiated in response to the detection of said opcode has an execution time shorter than the execution time of the second processor when executing the operation corresponding to said opcode.

9. The self-test mechanism of claim 7 wherein in response to detection of a self-test diagnostic error in the FPAP, the EU is not notified of said error until the next subsequent floating point operation is being executed by the FPAP.

10. The self-test mechanism of claim 7 or claim 9 wherein the means for initiating a self-diagnostic operation in the FPAP is adapted to select a self-diagnostic operation to be performed from among a plurality of available self-diagnostic operations, the selected self-diagnostic operation, in response to said opcode.

11. The self-test mechanism of claim 7 or claim 9 wherein the FPAP interprets non-floating point operands supplied to the EU over said bus as floating point operands and wherein such operands are used as test variables in said diagnostic operations.

* * * * *